United States Patent [19]

Willis et al.

[11] Patent Number: 4,639,763

[45] Date of Patent: Jan. 27, 1987

[54] INTERLACE TO NON-INTERLACE SCAN CONVERTER FOR RGB FORMAT VIDEO INPUT SIGNALS

[75] Inventors: Donald H. Willis, Marion County; Russell T. Fling, Fishers, both of Ind.

[73] Assignee: RCA Corporation, Princeton, N.J.

[21] Appl. No.: 729,014

[22] Filed: Apr. 30, 1985

[51] Int. Cl.[4] .............................................. H04N 9/77
[52] U.S. Cl. ................................. 358/11; 358/21 R; 358/37
[58] Field of Search .................. 358/11, 21 R, 37, 140

[56] References Cited

U.S. PATENT DOCUMENTS

| | | | |
|---|---|---|---|
| 3,732,360 | 5/1973 | Breimer et al. | 358/37 |
| 4,245,237 | 1/1981 | Lagoni | 358/31 |
| 4,400,719 | 8/1983 | Powers | 358/21 R |
| 4,415,931 | 11/1983 | Dischert | 358/242 |
| 4,422,094 | 12/1983 | Lewis, Jr. et al. | 358/37 |
| 4,558,347 | 12/1985 | Pritchard et al. | 358/11 |
| 4,573,068 | 2/1986 | Dorsey et al. | 358/11 |

Primary Examiner—John W. Shepperd
Attorney, Agent, or Firm—P. J. Rasmussen; P. M. Emanuel; R. G. Coalter

[57] ABSTRACT

A speed-up memory converts interlaced RGB input signals to double line-rate (progressive scan) form. A vertical detail signal is derived from the RGB input signals before or after speed-up and a vertical peaking signal is derived from the detail signal. During the first read operation of the speed-up memory both signals are added to the speeded-up signals to effect a preshoot of the resultant signal and during the second speed-up memory read operation only the peaking signal added to affect an overshoot of the resultant signals whereby alternate lines of the converted RGB signals exhibit enhanced vertical detail.

9 Claims, 7 Drawing Figures

INTERLACE TO NON-INTERLACE SCAN CONVERTER FOR RGB FORMAT VIDEO INPUT SIGNALS

FIELD OF THE INVENTION

This invention relates to television apparatus and particularly to apparatus for providing scan conversion of RGB format interlaced video input signals to output signals of non-interlaced ("progressive" scan) form.

BACKGROUND OF THE INVENTION

The advantages of displaying an interlaced video signal in non-interlaced or "progressive scan" form are well known and a number of arrangements have been proposed for providing such a scan conversion. For example, in U.S. Pat. No. 4,415,931 entitled TELEVISION DISPLAY WITH DOUBLED HORIZONTAL LINES which issued Nov. 15, 1983 to R. A. Dischert, progressive scan conversion of a luminance signal is obtained by displaying each incoming horizontal line twice thereby doubling the number of displayed raster lines. This is achieved by storing each incoming interlaced line in one of two memories. As one of the memories is being "written", the other memory is read twice thereby providing two lines of time compressed non-interlaced video for each line of interlaced video processed.

As another example, K. H. Powers describes a progressive scan converter in U.S. Pat. No. 4,400,719 entitled TELEVISION DISPLAY SYSTEM WITH REDUCED LINE-SCAN ARTIFACTS which issued Aug. 23, 1983, wherein the additional scan lines added to the video output signal are obtained by means of interpolation of the incoming scan lines.

It has been recognized by Pritchard et al. in U.S. Pat. application Ser. No. 526,702 filed Aug. 26, 1983 (now U.S. Pat. No. 4,558,347 which issued Dec. 10, 1985), entitled PROGRESSIVE SCAN TELEVSION SYSTEM EMPLOYING VERTICAL DETAIL ENHANCEMENT (assigned to the same assignee as the present application, and incorporated herein by reference) that interpolation, being essentially an averaging process, tends to reduce the vertical detail content of the interpolated signal. In that system, a line comb filter is used to provide luma-chroma separation and interpolation of the luma signal prior to time compression (video speed-up) in the converter speed-up memories. To restore the vertical detail lost by comb filtering, a vertical detail enhancement signal is generated by low pass filtering the chroma output of the comb filter. The low frequency vertical detail enhancement signal thus obtained is then combined with the "real" (i.e., received) and the interpolated lines to restore the vertical detail lost by comb filtering. In accordance with one aspect of their invention, the polarity of the vertical detail enhancement signal is alternated from line-to-line to effect preshoot and overshoot enhancement of the scan converted video output signal. Pritchard et al. further suggest that the vertical detail signal be subjected to a non-linear transfer function (e.g., coring, peaking, paring as described in U.S. Pat. No. 4,245,237 of Lagoni) for the purpose of providing an optimum balance between subjective enhancement and flicker of displayed images.

In the aforementioned scan conversion systems, the video input signal is of composite form and conversion to color component (RGB) form for subsequent kinescope display is performed subsequent to speed-up of the video signal. A scan converter suitable for use with video sources of either composite form or RGB form is described in the commonly assigned U.S. Pat. Application of Dorsey et al. entitled VIDEO SIGNAL PROCESSOR FOR PROGRESSIVE SCANNING, Ser. No. 591,996 filed Mar. 21, 1984 which issued Feb. 25, 1986, as U.S. Pat. No. 4,573,068 and incorporated by reference herein. In the Dorsey et al. system, the composite video input signal is comb filtered, detail enhanced and converted to RGB form prior to being time compressed to double the line rate. The RGB video input signals are coupled directly to the time compression (speed-up) memories without further processing. As noted by Dorsey et al., the RGB video input signal may be a computer that internally generates RGB signals with high horizontal and vertical resolution and so the vertical detail enhancement used for processing of the composite video signal to overcome the effects of comb filtering is not needed when processing the RGB format video input signal.

SUMMARY OF THE INVENTION

It is recognized herein that in certain applications it may be desirable to enhance vertical detail in progressive scan processors intended for use with video input signals of color component (RGB) form as, for example, where the RGB source is of a relatively low vertical resolution type (e.g. a color camera, for example) rather than a computer or some other source of relatively high resolution RGB video signals.

The present invention is directed to meeting the need for an interlaced to non-interlaced scan converter suitable for use with video input signals of color component form (e.g., RGB) which provides vertical detail enhancement inclusive of both a preshoot and an overshoot for transitions in either sense of the luminance content of the video signals being processed.

Scan conversion apparatus in accordance with the present invention comprises a source for providing first, second and third color component signals representative of an image raster scanned in interlaced fashion at a given horizontal line rate. A video speed-up circuit means, coupled to the signal source means, doubles the line rate of the color component signals. A vertical detail signal forming means, coupled to one of the video signal source means or the video speed-up circuit means, provides a double line-rate vertical detail representative output signal. A processing means, coupled to the vertical detail signal forming means, provides a double line-rate vertical peaking output signal. An output circuit means is provided having a first operative condition for combining the vertical peaking and detail signals with every other line of the double line-rate video output signal for causing the those lines to exhibit preshoot and having a second operative condition for combining only the vertical peaking signal with intermediate lines of the double line-rate video output signals for causing the intermediate lines to exhibt overshoot.

BRIEF DESCRIPTION OF THE DRAWING

The invention is illustrated in the accompanying drawing wherein like elements are denoted by like reference designators and in which.

DETAILED DESCRIPTION

Figure 1:
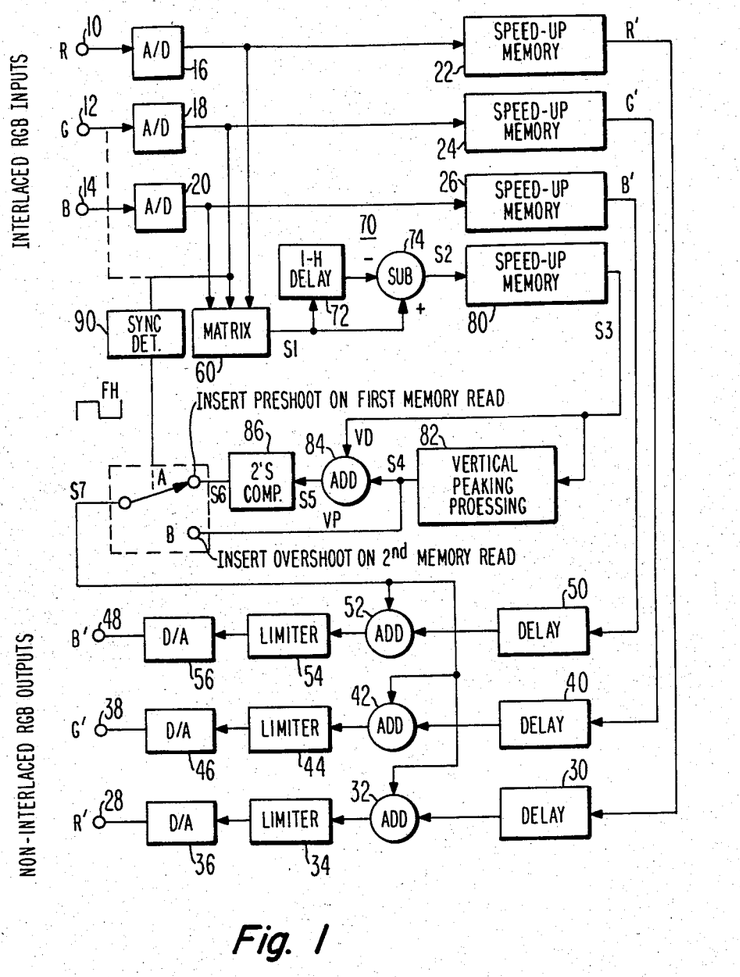
FIG. 1 is a block diagram of a scan converter embodying the invention.

The progressive scan converter of FIG. 1 includes three input terminals 10, 12 and 14 for receiving red (R), green (G) and blue (B) baseband color component video input signals representative of an image raster scanned in interlaced fashion at a given horizontal line rate from a suitable source (not shown) such as a computer or color camera. For purposes of illustration it will be assumed that the RGB signals conform to the NTSC standard horizontal line rate and have an interlace factor of 2:1. The principles of the invention are of general utility, however, and may be used for converting interlaced signals of other line rates and higher interlace factors to progressive scan form as will be appreciated from the following illustrative examples.

Input terminals 10, 12 and 14 are coupled via respective analog-to-digital (A/D) converters 16, 18 and 20 to the inputs of respective video speed-up memory units 22, 24 and 26. Converters 16–20 are of conventional design and may be omitted in applications where the RGB input signals are already in digital form. Converters 16–20 may also be omitted in applications where subsequent video processing is done in analog rather than digital form. For example, processing functions such as video speed-up (time compression), peaking, coring, pearing, matrixing, etc. may readily be provided by analog rather than digital signal processing circuits as will be explained.

Figure 2A:
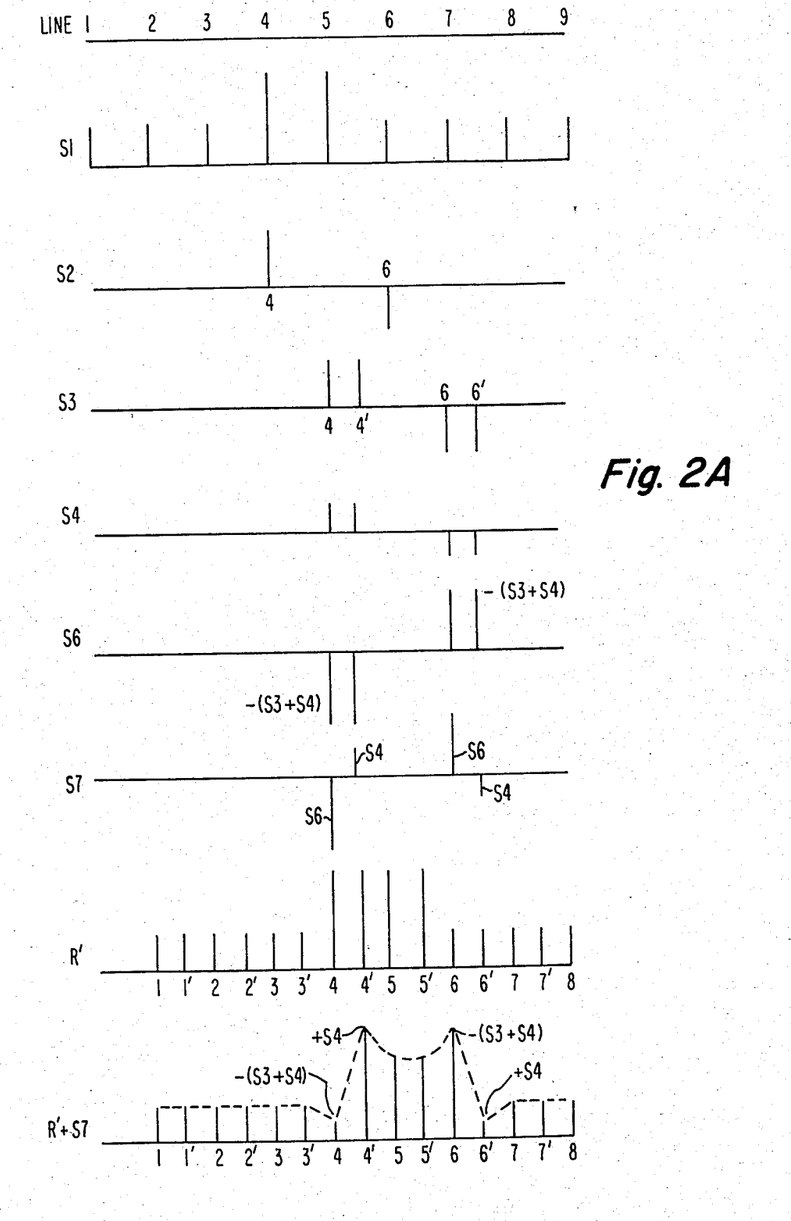
FIGS. 2A and 2B are signal timing diagrams illustrating operation of the scan converter of FIG. 1.
Figure 2B:
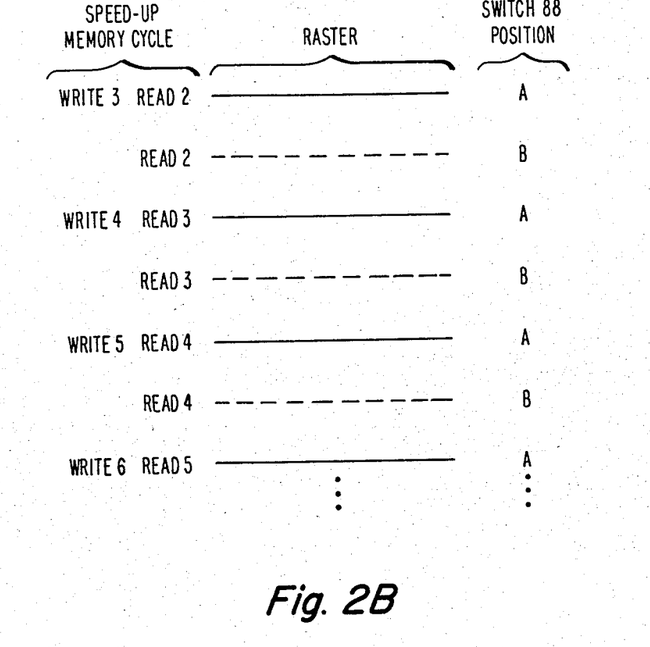
Figure 2C:
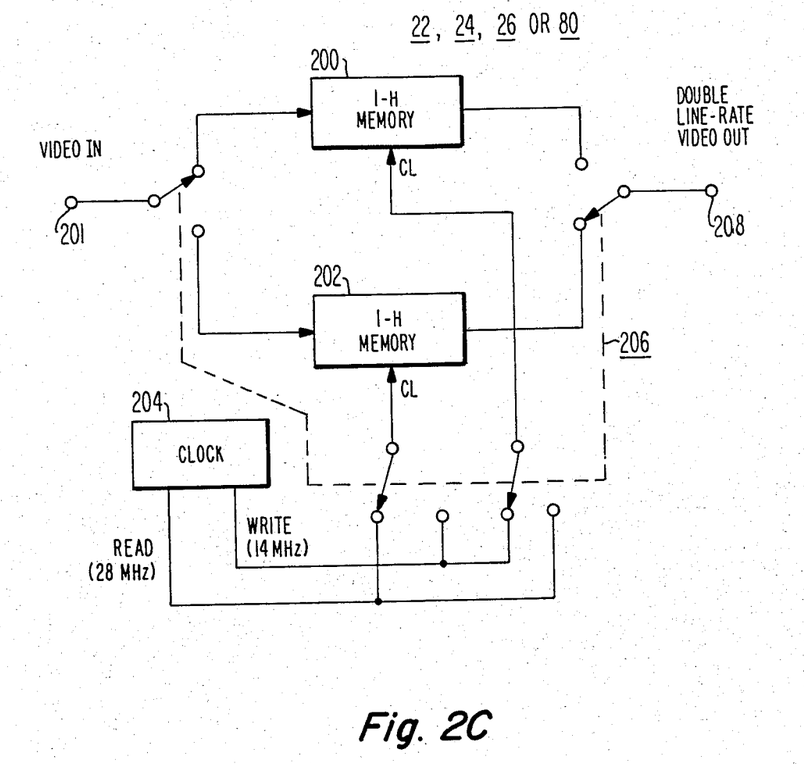
FIG. 2C is a block diagram of a video speed-up memory suitable for use in the converter of FIG. 1.

Speed-up memories 22, 24 and 26 provide the function of doubling the line rate of the RGC color input signals supplied thereto and may be of the type described in the aforementioned U.S patents and applications. FIG. 2C is exemplary of such a memory which comprises a pair of one line (1-H) memories 200 and 202 and a source of read/write clock signals 204 with the read clock frequency (e.g. 28 MHz) being double the write clock frequency (e.g., 14 MHz). A four section switch, indicated generally as 206, provides memory input/output and clock selection. For the switch position shown, memory 200 receives the write clock and the video input signal from terminal 201 while memory 202 receives the read clock (at double the write clock frequency) and supplies a stored video output signal to terminal 208. The switch position is changed at the incoming video line rate. Accordingly, as one line of video is stored in one of memories 200 and 202 the other memory is "read" twice thereby producing two lines of output video for each incoming line and thus doubling the line rate and the number of lines per field. Doubling the line rate in this manner for video input signals having a 2:1 interlace factor results in video output signals (indicated by primes, R', G' and B') of non-interlace or progressive scan form. The double line-rate non-interlaced signal R' is coupled to scan converter output terminal 28 via a delay unit 30, an adder 32, a limiter 34 and a digital-to-analog converter 36 connected in cascade. The remaining delay units 40 and 50, adders 42 and 52, limiters 44 and 54 and converters 46 and 56 are similarly arranged for coupling signals G' and B' to output terminals 38 and 48, respectively.

The function of delay units 30, 40 and 50 is to compensate for processing delays in the signal path to be described which generates preshoot and overshoot inducing signals which are ultimately added to the double line rate signals R', B' and G' in adders 32, 42 and 52, respectively. For this purpose, units 30, 40 and 50 may comprise conventional data latches clocked at the read clock rate of the speed-up memories (e.g., 28 MHz, for example) with the number of latches selected so that the net delay is about equal to the net delay in generating the compensating (peaking) signals thereby ensuring proper registration of the signals added in adders 32, 42 and 52.

Limiters 34, 44 and 54 provide the function of preventing the output signals of adders 32, 42 and 52 from exceeding the dynamic range of digital-to-analog converters 36, 46 and 56, respectively. Illustratively, the limiting values may correspond to the equivalent of zero (0) and one-hundred (100) IRE units or binary values of 0 and 255 where the video signals are digitized to eight-bit resolution. Limiting is not necessary, however, in applications where the digital-to-analog converters have sufficient dynamic range. Limiting may also be omitted in applications where the video processing is done in analog form and the analog circuitry has suitable dynamic range to accomodate video component signals having preshoot and overshoot. Converters 36, 46 and 56 are of conventional design and provide the function of converting digital signals back to analog form suitable for use by conventinal kinescope driver circuitry for ultimate display of the scan converted signals.

The remaining elements of FIG. 1 provide processing in accordance with the invention for enhancing the vertical detail content of the double line-rate color component video signals R', G' and B' developed by speed-up memory units 22, 24 and 26. This processing comprises essentially three steps. First, a double line-rate vertical detail representative signal is formed from the RGB video input signals in this example of the invention. In subsequent examples it will be shown how to derive the vertical detail representative signal from the double line-rate signals R', G' and B'. Second, a vertical "peaking" signal is derived from the vertical detail signal. Provisions are made for coring and paring this peaking signal. Finally, provision is made for combining the peaking and detail signals with every other line of the double line-rate RGB signals for inducing preshoot and for combining the peaking signal with intermediate lines of the double line-rate RGB signals for inducing overshoot thereby enhancing vertical transitions of the resultant R'G'B' double line-rate color component signals provided at terminals 28, 38 and 48.

Three elements are involved in this example of the invention for generating the aforementined vertical detail representative signal. The first is simply a matrix 60 which adds the digitized RGB video input signals in conventional proportions (e.g., approximately $0.59 + 0.30 R + 0.11 B$) to form an output signal S1 proportional to the luminance content of the RGB input signals. Where processing is in analog form, the amplitude scaling and addition may be provided by a conventional resistor matrix. Where processing is in digital form, the addition may be performed by digital adders and the scaling may be performed by appropriate connection of the outputs of converters 16, 18 and 20 to the adder inputs in known manner. For example, by connecting the 6 most significant bits of signal R and the 5 most significant bits of signal R to an adder, the sum will represent R/4 plus R/8 which equals 0.375 R. This, to a good approximation, equals the desired value of 0.38 R. The remaining signals G and B are similarly scaled and added to R to generate the luminance representative signal S1.

The luminance representative signal S1 is applied to a comb filter (indicated generally as 70) to generate a vertical detail representative signal S2. Filter 70 comprises a 1-H (one horizontal scanning line) delay element 72 which delays signal S1 by one horizontal line interval. A subtractor 74 subtracts the delayed signal from signal S1 thereby forming a comb filter having response peaks at odd multiples of one half the line rate of signal S1. This signal, S2, represents the vertical detail content of signals R, G and B, that is, the line-to-line variations in luminance level of signals R, G and B. A speed-up memory unit 80, which may be identical to the other speed-up units 22, 24 and 26, doubles the line rate of the vertical detail representative signal S2 by repeating each line as previously described.

The double line-rate vertical detail representative signal (S3) from speed-up memory 80 is applied to a vertical peaking processing unit 82 which generates a double line-rate vertical peaking signal S4. Unit 82 perferrably comprises a conventional random access memory (RAM) or a read only memory (ROM) programmed with a suitable non-linear transfer function for providing coring and pearing of the vertical detail signal S3. Suitable transfer functions are described in the previously mentioned Lagoni patent. An example of a suitable digital implementation of processor 82 is given in U.S. Pat. No. 4,422,094 entitled DIGITAL SIGNAL PROCESSOR WITH SYMMETRICAL TRANSFER CHARACTERISTIC which issued Dec. 20, 1983 to Lewis Jr. et al. Where coring and pearing are not desired, unit 82 may be replaced with an attenuator which generates a peaking signal S4 by simply attenutating signal S3 (i.e., dividing signal S3 by a constant). For either choice (i.e., linear or non-linear processing) signal S4 represents a predetermined amplitude portion of the vertical detail representative signal S3 which determines the magnitude of the preshoots and overshoots imparted to the double line-rate signals R', G' and B'.

The remaining elements of FIG. 1, namely, a 2's complementor 86, a switch 88, and a sync detector 90, in combination with adders 32, 42 and 52, comprise an output means having a first operative condition for combining the vertical peaking (S4) and vertical detail (S3) signals with every other line of the double line-rate video output signals (R'B'G') for causing those lines to exhibit preshoot and having a second operative condition for combining the vertical peaking signal with the remaining (intermediate) lines of the double line-rate video output signals for causing the intermediate lines thereof to exhibit overshoot.

Adder 84 adds signals S3 and S4 thereby creating a sum signal S5 which is converted to 2's complement form (signal S6) by means of converter 86. As is well known, the 2's complement of a binary number is mathmetically equivalent to the negative of the number and is formed by inverting the number and adding one. Accordingly, when a 2's complemented number is added to another number, the result is subtraction of the number whioh has been 2's complemented from the other number. This signal, S6, is the preshoot inducing signal of the present invention. FIG. 2A illustrates generation of signal S6 from signals S3 and S4 for an assumjed transition in signal S1. Switch 88 is operated at line rate so as to add signal S6 to the R'G'B' signals during the first time each memory is read thereby subtracting the vertical detail and vertical peaking signal S3 and S4 from the R'G'B' signals. The effect is as follows. The S3 signal component "kills", so to speak, the vertical detail component of the component signal R', B' and G'. The S4 component which remains thus forces R', G' and B' to preshoot their original values by an amount equal to signal S4. Switch 88 adds the vertical peaking signal S4 to signals R', G' and B' on intermediate lines thereby causing the double line-rate signals to exhibit overshoot equal to signal S4 in accordance with the invention. This is illustrated by the waveforms S7, R' and R'+S7 in FIG. 2A.

Control of switch 88 at line rate is provided by sync detector 90 which detects the horizontal synchronizing component of the green signal provided by A/D converter 18. An analog sync detector may be used by connecting the detector to the input of converter 18 as indicated by dashed lines. Regardless of whether analog or digital means are used for detecting horizontal sync, it is important that detector 90 places switch 88 in position A during the first read cycle of memories 22, 24 and 26 and to place switch 88 in position B during the second memory read cycle. The reason is that the preshoot inducing signal (S6) differs substantially in magnitude and sign from the overshoot inducing signal (S4) and must be added in the proper sequence to the double line-rate RGB output signals. This is illustrated in more detail in FIG. 2A and in FIG. 2B (where every other line of the exemplary raster is indicated by a solid line and intermediate lines are indicated by dashed lines).

FIG. 2A provides a detailed representation of the foregoing described operation of the scan converter of FIG. 1 and additionally illustrates certain timing requirements regarding addition of the preshoot and overshoot inducing signals to the double line-rate RGB signals. Basically, the timing is such that the preshoot signal S6 is added during the first memory read operation and the overshoot inducing signal S4 is added during the second memory read operation. The read operations and switch positions are illustrated in FIG. 2B.

In FIG. 2A the horizontal scale represents lines of video signals being processed and the vertical scale represents amplitude. The luminance representative signal S1 is shown for the case where the luma content of signals R, G and B is constant for the first three lines, increases for lines 4 and 5 and then returns to its original level for the remaining lines 6-9. The comb filtered vertical detail signal S2 thus exhibits a positive value for line 4 representing the positive going line 3 to line 4 transition and represents a negative vlue for line 6 representing the negative going lines to line 6 transition. After speed-up in unit 80, the double line-rate vertical detail signal S3 is positive for speed-up lines 5 and 5' corresponding to the first and second speed-up memory read operations (see FIG. 2B) and is negative for speed-up lines 7 and 7'. The peaking signal S4 is a fraction of the detail siqnal S3. Signal S6 represents the sum of signals S3 and S4 inverted (2's complemented). Signal S7 represents the output of switch 88 which is to be added to signals R', G' and B; to form the resultant output signals R′+S7 B+S7 and G′+S7. Note that as shown in FIG. 2B and FIG. 2A the preshoot is created during each first memory operation by subtracting S3+S4 whereas the overshoot is created during each second memory read operation by adding only signal S4. This obtains for a transition in either sense of the signal as shown for output lines 6 and 6′. (FIG. 2A).

Figure 3:
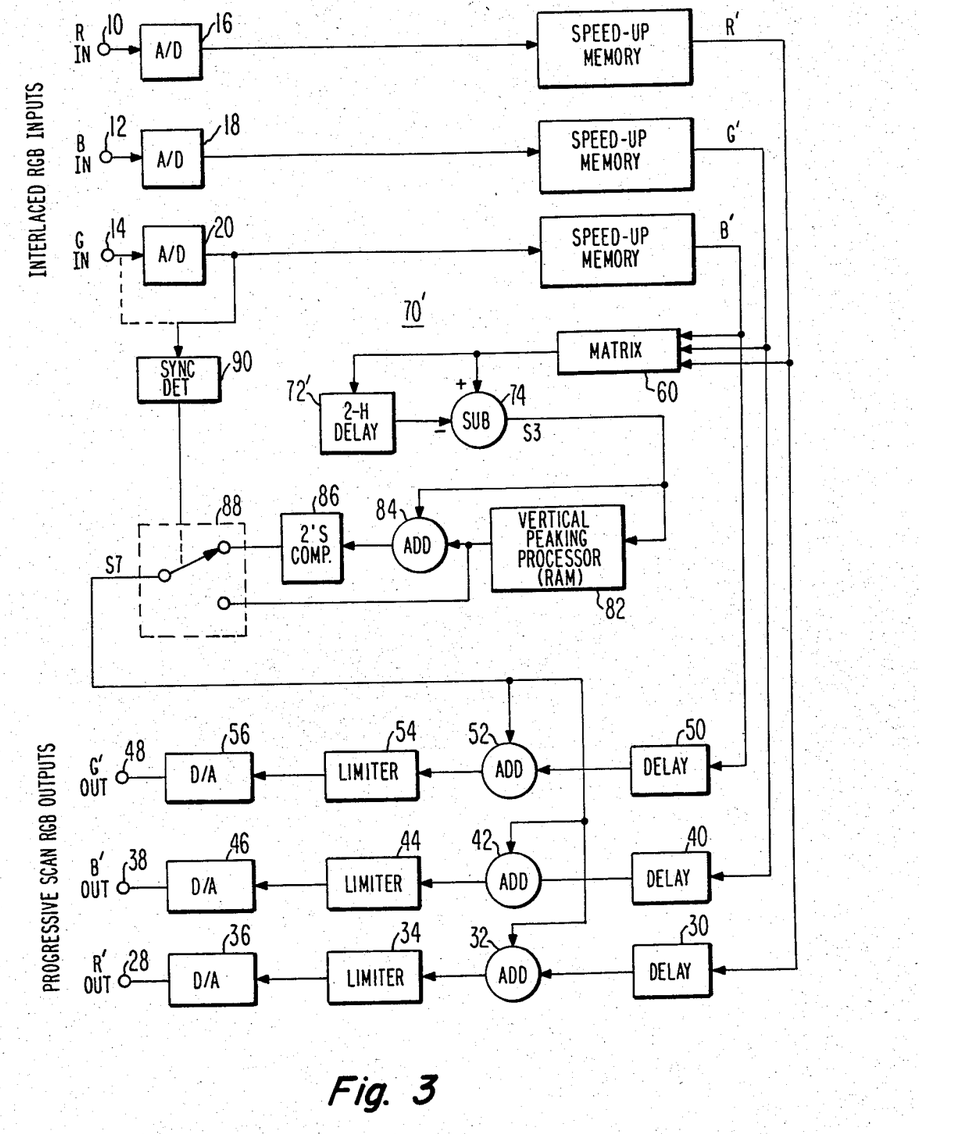
FIG. 3 is a block diagram illustrating a modification of the scan converter of FIG. 1.
Figure 5:
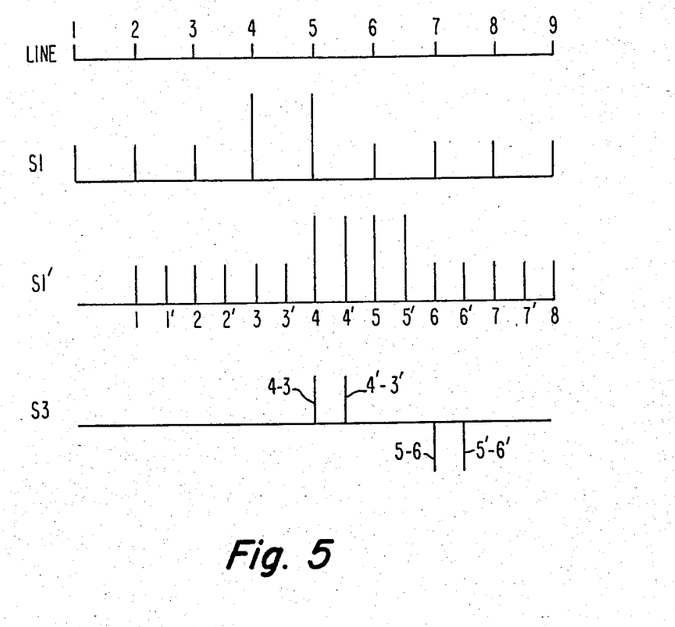
FIG. 5 is a signal timing diagram illustrating certain aspects of operation of the modified scan converters of FIGS. 3 and 4.

In FIG. 3 the scan converter of FIG. 1 has been modified to obtain the double line-rate luminance representative signal S3 from the double line-rate video signals R′, G′ and B′ thereby eliminating the need for speed-up memory 80. Specifically, matrix 60 is coupled to the outputs of memories 22, 24 and 26 rather than the memory inputs and the delay of unit 72 has been changed from 1-H to 2-H. Matrixing after video speed-up followed by 2-H combing is functionally equivalent to matrixing before speed-up and 1-H combing as indicated in the timing diagram of FIG. 5 where S1 represents the luma content of the incoming RGB signals, S2 represents the luma content of the double line-rate R′G′B′ speeded-up signals and S3 represents the output of the 2-H comb filter 70′. Otherwise the operation is the same as in FIG. 1.

Figure 4:
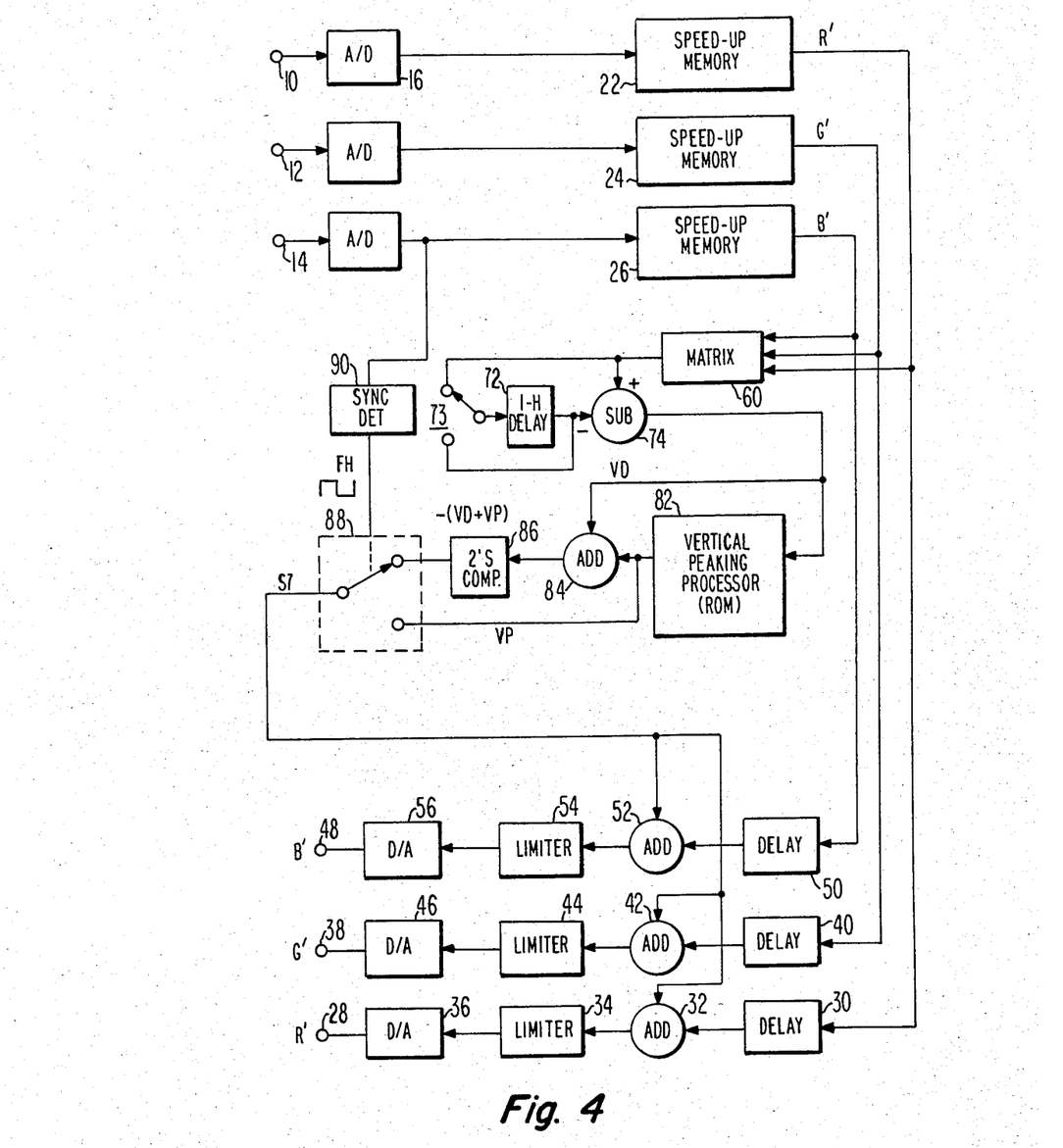
FIG. 4 is a block diagram illustrating a modification of the scan converter of FIG. 3.

FIG. 3 may be modified as shown in FIG. 4 to provide further reduction in memory requirements by replacing 2-H memory 72′ with a 1-H memory and a switch 73 operated at line rate which recirculates the 1-H memory contents to simulate 2-H memory operation. With this exception, the overall operation is otherwise the same as previously described.

What is claimed:

1. Interlaced to non-interlaced scan conversion apparatus, comprising:
    input means for receiving first, second and third color component signals representative of an image raster scanned in interlaced fashion at a given horizontal line rate;
    video speed-up circuit means, coupled to said input means, for providing first, second and third double line rate color component video ouput signals;
    vertical detail signal forming means, coupled to a selected one of said input means and said speed-up circuit means, for providing a double line-rate vertical detail representative signal;
    processing means, coupled to said vertical detail signal forming means, for providing a double line rate vertical peaking signal; and
    output means, having a first operative condition for combining said vertical peaking and detail signals with every other line of said double line-rate video output signals for causing said other lines to exhibit preshoot and having a second operative condition for combining said vertical peaking signal with intermediate lines of said double line-rate video output signals for causing the intermediate lines to exhibit overshoot.

2. Scan conversion apparatus as recited in claim 1 wherein said video speed-up circuit means comprises memory means having a write mode for storing each line of said color component signals and having first and second read modes for recovering each stored line twice thereby doubling the line rate of the stored signals and wherein said output means includes circuit means for placing said output means in said first operative condition during said first read mode of said memory means and for placing said output means in said second operative condition during said second read mode of said memory means.

3. Apparatus as recited in claim 1 wherein said output means comprises:
    first means for adding said vertical peaking and detail signals to form a sum signal; and
    circuit means for subtracting said sum signal from said every other line of said double line-rate video output signals and for adding said peaking signal to said intermediate lines of said double line-rate video output signals.

4. Apparatus as recited in claim 3 wherein said circuit means comprises:
    first, second and third adder means, each having a first input for receiving a respective one of said double line-rate video output signals and having a second input;
    inverter means for inverting said sum signal; and
    switch means for selectively coupling said second inputs of said first, second and third adder means to said inverter means and to said processing means.

5. Interlaced to non-interlaced scan conversion apparatus, comprising:
    input means for receiving first, second and third color component signals representative of an image raster scanned in interlaced fashion at a given horizontal line rate;
    video speed-up circuit means, coupled to said input means, for providing first, second and third double line rate color component video output signals;
    vertical detail signal forming means, coupled to said input means for providing a double line-rate vertical detail representative signal;
    processing means, coupled to said vertical detail signal forming means, for providing a double line rate vertical peaking signal;
    output means, having a first operative condition for combining said vertical peaking and detail signals with every other line of said double line-rate video output signals for causing said other lines to exhibit preshoot and having a second operative condition for combining said vertical peaking signal with intermediate lines of said double line-rate video output signals for causing the intermediate lines to exhibit overshoot, and wherein said vertical detail signal forming means comprises:
    matrix means coupled to said input means for forming a luminance representative signal at said given line rate;
    comb filter means coupled to said matrix means for forming a vertical detail representative signal at said given line rate; and
    further video speed up circuit means coupled to said comb filter means for providing said double line-rate vertical detail representative signal.

6. Interlaced to non-interlaced scan conversion apparatus, comprising:
    input means for receiving first, second and third color component signals representative of an image raster scanned in interlaced fashion at a given horizontal line rate;
    video speed-up circuit means, coupled to said input means, for providing first, second and third double line rate color component video output signals;
    vertical detail signal forming means, coupled to said speed-up circuit means, for providing a double line-rate vertical detail representative signal;
    processing means, coupled to said vertical detail signal forming means, for providing a double line rate vertical peaking signal; and output means, having a first operative condition for combining said vertical peaking and detail signals with every other line of said double line-rate video output signals for causing said other lines to exhibit preshoot and having a second operative condition for combining said vertical peaking signal with intermediate lines of said double line-rate video output signals for causing the intermediate lines to exhibit overshoot, and wherein said vertical detail signal forming means comprises:

matrix means coupled to said video speed-up circuit means for providing a luminance representative signal at double said given line rate; and comb filter means coupled to said matrix means for forming said double line-rate vertical detail representative signal.

7. Scan conversion apparatus as recited in claim 6 wherein said comb filter means comprises delay means having an input and an output, switch means for selectively connecting said input of said delay means to said output thereof and to said matrix means and subtractor means having a first input connected to said matrix means and a second input connected to said output of said delay means.

8. Interlaced to non-interlaced scan conversion apparatus, comprising:

input means for receiving first, second and third color component signals representative of an image raster scanned in interlaced fashion at a given horizontal line rate;

video speed-up circuit means, coupled to said input means, for providing first, second and third double line rate color component video output signals;

vertical detail signal forming means, coupled to said input means for providing a double line-rate vertical detail representative signal;

processing means, coupled to said vertical detail signal forming means, for providing a double line rate vertical peaking signal; and output means, having a first operative condition for combining said vertical peaking and detail signals with every other line of said double line-rate video output signals for causing said other lines to exhibit preshoot and having a second operative condition for combining said vertical peaking signal with intermediate lines of said double line-rate video output signals for causing the intermediate lines to exhibit overshoot.

9. Interlaced to non-interlaced scan conversion apparatus, comprising:

input means for receiving first, second and third color component signals representative of an image raster scanned in interlaced fashion at a given horizontal line rate;

video speed-up circuit means, coupled to said input means, for providing first, second and third double line rate color component video output signals;

vertical detail signal forming means, coupled to said speed-up circuit means, for providing a double line-rate vertical detail representative signal;

processing means, coupled to said vertical detail signal forming means, for providing a double line rate vertical peaking signal; and output means, having a first operative condition for combining said vertical peaking and detail signals with every other line of said double line-rate video output signals for causing said other lines to exhibit preshoot and having a second operative condition for combining said vertical peaking signal with intermediate lines of said double line-rate video output signals for causing the intermediate lines to exhibit overshoot.

* * * * *